May 29, 1928.
T. B. CLARK
WATER SOFTENER
Filed Oct. 21, 1927
1,671,699
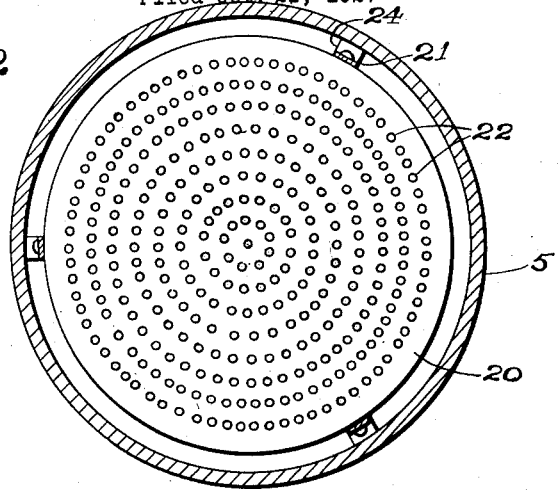
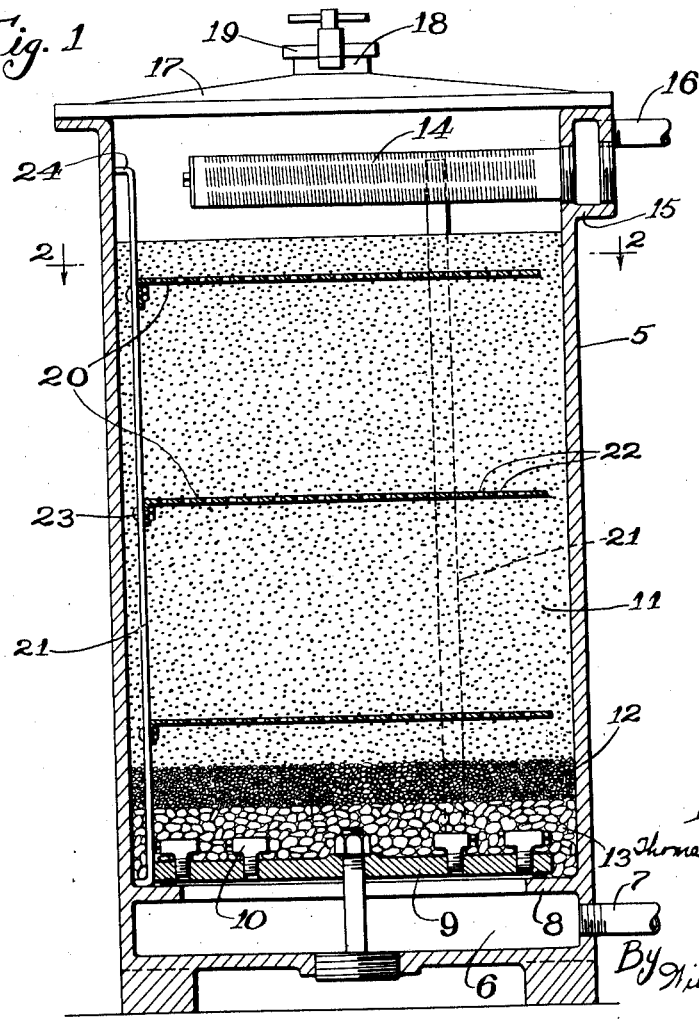
Inventor
Thomas B. Clark
By Wilson & McCanna
Atty's Patented May 29, 1928.

1,671,699

UNITED STATES PATENT OFFICE.

THOMAS B. CLARK, OF ROCKFORD, ILLINOIS, ASSIGNOR TO WARD-LOVE PUMP CORPORATION, OF ROCKFORD, ILLINOIS, A CORPORATION OF ILLINOIS.

WATER SOFTENER.

Application filed October 21, 1927. Serial No. 227,642.

This invention relates to water softeners operating on the base-exchange principle.

In the operation of upflow water softeners having confined beds, service tests have shown that there is always apt to be more or less hard water drawn at the beginning of the flow where the water is turned on and off time and again to simulate actual service conditions of operation. This behavior was more pronounced at higher rates of flow and especially with finer minerals. Considerable experiment and study disclosed that whenever water is drawn, the bed rises as the water is turned on and settles when the water is turned off. The settling, however, was found to be haphazard, one side settling faster than the other and usually causing a rolling action, more aggravated sometimes than others, in which the more or less exhausted mineral from the bottom of the bed was carried toward the top and the fresh mineral from the top was thrown toward the bottom. This disturbance of the bed, which in itself is considered very objectionable for reasons well known in this art, explains the discharging of hard water from the softener at the beginning of the flow; the hard water beneath the bed at the time the bed commences to settle practically by-passes the bed during the rolling action referred to and thus finds its way to the top of the tank without undergoing treatment and is, of course, the first water to be discharged the next time water is drawn. It is, therefore, the principal object of the present invention to provide means in the nature of baffles or dampers to bring about uniform settling of the bed and curtail any movement of the mineral in eddy currents, to the end that the more exhausted mineral at or near the bottom of the bed will keep its relation to the fresher mineral at the top of the bed and no water will be permitted to by-pass or channel through the bed.

Another object is to provide the baffles or dampers of such size, construction and arrangement that the mineral is relatively free to course through, between, and about the same so that they do not act as real partitions and, furthermore, do not seriously impede the flow of water through the bed.

The invention is illustrated in the accompanying drawing showing in Figure 1 a vertical section through a softener equipped with a set of baffles as herein described, and in Fig. 2 a horizontal section taken on the line 2—2 of Fig. 1.

While this invention is not limited in its application to any particular type of softeners, with the only exception perhaps that it is particularly designed for use on upflow softeners, I have illustrated the same as embodied in a softener comprising a tank 5 cast to provide a settling chamber 6 in the bottom thereof with which the hard water inlet pipe 7 has communication. A rim 8, cast integral with the wall of the tank and defining the top of the chamber 6, supports a distributor plate 9 equipped with strainer nozzles 10 which in turn supports a bed 11 of zeolite, or other base-exchange water softening material, on layers 12 and 13 of fine and coarse gravel, respectively. A strainer tube 14, communicating with a hollow boss 15 cast integral with the side wall of the tank, serves as the outlet for the softened water which is discharged from the softener through a service pipe 16. The tank is closed at the top by a lid 17 having the usual filler neck 18 sealed by a removable cap 19 permitting the pouring in of salt or brine for the regeneration of the softener in a manner well known in this art. No invention is claimed in the particular details of construction as thus far described excepting only in so far as they contribute toward the performance of my invention, and it will be further understood that while a hand-operated softener has been illustrated the invention has equal application to automatic or semi-automatic softeners.

As stated above, an ordinary upflow softener of the type illustrated was found on service tests to deliver hard water at the beginning of each flow where the water was turned on and off repeatedly to simulate as nearly as possible the usual service conditions. It was only after considerable testing and study that an explanation for such operation was arrived at. It was found that this behavior was most noticeable at higher rates of flow and especially with the finer and consequently lighter minerals, which it is preferred to use for the reason that they give greater capacity for softening and generally higher efficiency. It was observed that the mineral bed rises off the bed of gravel when the water is turned on and settles again when the water is turned off but the settling is very haphazard, so much so that the entire mineral bed actually rolls or teeters and the more exhausted mineral does not remain at the bottom but will find its way toward the top and the fresher mineral from the top will come to the bottom. This disturbance of the bed, which in itself is highly objectionable for reasons well known and generally understood in this art, is responsible for the hard water discharge referred to because of the fact that the hard water beneath the mineral bed at the time the water is shut off and the bed is about to settle, finds its way to the top of the tank in the eddy currents which accompany the rolling of the bed. This untreated water is, therefore, first to be discharged the next time the water is turned on. In accordance with my invention a set of baffles or dampers 20 are provided in the bed 11 supported in parallel spaced relation on upright frame members 21. The baffles are herein illustrated as fairly made of sheet metal with innumerable large perforations 22, of say one quarter inch diameter, so as to permit the mineral to pass semi-freely through the baffles, the baffles being also preferably, although not necessarily, a bit smaller in diameter than the inside of the tank to give the mineral perfect freedom to flow about and between the baffles. It will, therefore, be apparent that the surging back and forth of the mineral bed is buffed or cushioned and it is caused to settle gently and uniformly. The baffles, for all practical purposes, may be made of screens, grates, or any other foraminous or reticulated material equivalent to that herein shown. The baffles are illustrated as bolted to the upright frame members 21, as at 23. The frame members 21 constitute supporting legs whereby the lowermost baffle is disposed above the layers 12 and 13 of gravel near the bottom of the bed 11, and also serve to maintain the baffles in central position by having the ends thereof bent outwardly, as shown at 24, for engagement with the wall of the tank.

In operation, it will be evident that the mineral bed 11 will rise with the rising column of water in the tank when the water is turned on, the mineral flowing semi-freely through the openings 22 and practically without restriction around the edges of the baffles 20. When the water is shut off and the mineral bed settles, some of the mineral passes again semi-freely through the openings 22 while the rest spreads out and passes downwardly about the edges of the baffles until the entire bed has resumed its former position. Manifestly the more exhausted mineral at or near the bottom of the bed keeps its relation to the less exhausted mineral at or near the top of the bed and, more important still, there is no occasion for water to by-pass or channel through the bed from the bottom thereof to the top of the tank in the manner above referred to. Tests have shown that a softener equipped with a set of baffles as herein described will always deliver soft water no matter how abruptly the water is turned on and off and regardless of the time interval allowed for settling between the turning off and turning on of the water.

I claim:

1. In a water softener comprising a tank containing a confined bed of water softening material and having means for admitting hard water to said tank at the bottom thereof and for discharging softened water from said tank at the top thereof, one or more baffles disposed horizontally in said bed and arranged to permit the passage of the water softening material past the same in either direction between the edges thereof and the walls of the tank so that the material as a mass can rise and settle relative to the baffles in the turning on and off of the water.

2. A water softener as set forth in claim 1 wherein the baffles are foraminous so as to permit the passage of the water therethrough and avoid excessive restriction to flow.

3. A softener as set forth in claim 1 wherein the baffles have openings therethrough large enough to permit not only the free passage of water therethrough but also the semi-free passage therethrough of the water softening material.

4. In a water softener comprising a tank containing a bed of water softening material and having means for admitting hard water to said tank at the bottom thereof and for discharging softened water from said tank at the top thereof, one or more baffles disposed horizontally in said bed and arranged to permit the passage of the water softening material through the same in either direction so that the material as a mass can rise and settle relative to the baffles in the turning on and off of the water.

5. In a water softener comprising a tank containing a bed of water softening material and having means for admitting hard water to said tank at the bottom thereof and water to said tank at the bottom thereof and for discharging softened water from said tank at the top thereof, a plurality of spaced parallel baffles of foraminous material disposed horizontally in said bed transverse to the direction of the water flow therethrough and arranged to permit the material to wash up and down therethrough, means for securing said baffles together in fixed spaced relation and for supporting the baffles so that the lowermost baffle is elevated from the bottom of the bed.

6. A softener as set forth in claim 5 wherein the baffles are of such size that the edges thereof are spaced from the walls of the tank, and wherein the last-mentioned means also serves to maintain the baffles in central relation in said tank.

7. A water softener as set forth in claim 5 wherein the baffles are of such size that the edges thereof are spaced from the walls of the tank, and wherein the last-mentioned means comprises a plurality of upright supporting members secured to said baffles at the edges thereof having outwardly directed ends engaging the wall of the tank, so as to space said members in a predetermined relation to the wall of the tank and maintain the baffles correspondingly spaced at their edges from the wall of the tank.

8. A softener as set forth in claim 5 wherein the last-mentioned means comprises one or more members attached to all of said baffles whereby the baffles are connected together for entry and removal thereof from the tank as a unitary assembly.

In witness of the foregoing I affix my signature.

THOMAS B. CLARK.